(12) United States Patent
Zaremba et al.

(10) Patent No.: US 6,904,813 B2
(45) Date of Patent: Jun. 14, 2005

(54) SYSTEM AND METHOD FOR MONITORING TORQUE IN AN ELECTRIC MOTOR

(75) Inventors: Alexander T. Zaremba, Dearborn Heights, MI (US); Miroslava Jankovic, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/605,066

(22) Filed: Sep. 5, 2003

(65) Prior Publication Data

US 2005/0050965 A1 Mar. 10, 2005

(51) Int. Cl.[7] .......................... B25B 23/14; G01L 3/02
(52) U.S. Cl. ........................ 73/862.23; 73/862.193
(58) Field of Search ................... 73/862.16, 862.23, 73/862.27, 862.28, 862.29, 862.193

(56) References Cited

U.S. PATENT DOCUMENTS

| | | | |
|---|---|---|---|
| 5,543,695 A | 8/1996 | Culp et al. | |
| 5,670,856 A | 9/1997 | Le et al. | |
| 6,646,394 B2 | * 11/2003 | Minagawa et al. | 318/151 |
| 6,784,563 B2 | * 8/2004 | Nada | 290/40 C |
| 2003/0102181 A1 | * 6/2003 | Tokumoto | 180/446 |

* cited by examiner

Primary Examiner—Max Noori
Assistant Examiner—Lilybett Martir
(74) Attorney, Agent, or Firm—Brooks Kushman, P.C.; Carlos Hanze

(57) ABSTRACT

A method for monitoring torque in an electric motor is provided. First, the motor current is measured and the AC torque is determined based on the measured current. The speed of the motor and the DC motor power are then determined. The DC torque is calculated as a function of the DC motor power and the motor speed. The DC torque is then compared to the AC torque. After the AC torque is verified, it is compared to a reference torque to determine if the difference between the torques is within a torque deviation tolerance.

23 Claims, 6 Drawing Sheets

# US 6,904,813 B2

SYSTEM AND METHOD FOR MONITORING TORQUE IN AN ELECTRIC MOTOR

BACKGROUND OF INVENTION

1. Field of the Invention

The present invention relates to a system and method for monitoring torque in an electric motor.

2. Background Art

With the increasing use of electric motors to drive mechanical systems—e.g., as an alternative to an internal combustion engine to power a vehicle—the need for effective motor control systems is increasingly important. A motor control system may monitor various system components, such as the electric motor itself, sensors used to monitor and provide information about the operation of the electric motor, or both. One such controller arrangement is described in U.S. Pat. No. 5,670,856 issued to Le et al. on Sep. 23, 1997. Le et al. describes a motor controller arrangement for an apparatus that is driven by a number of redundant electric motors. Various motor parameters such as position, speed, and current, are monitored by a plurality of controllers which exchange data over a data bus. The redundant arrangement is configured such that each control channel carries a portion of the overall system load. If one of the channels fails, the remaining channels increase their operational capacity to allow full operation of the driven apparatus.

In order for a motor control system to be effective, the associated monitoring systems must be equally effective. When an electric motor is used to drive a vehicle, monitoring a number of motor parameters is important. For example, knowing the motor speed may be important for accurately determining the speed of the vehicle. The motor speed may also be used to determine the overall power output by the motor. Another important motor parameter is the motor torque. A vehicle operator commands the vehicle to provide a certain acceleration; this acceleration is processed into a motor torque command. The torque output of the motor should closely match the torque command; otherwise, the vehicle operator may receive unexpected results. Therefore, there exists a need for monitoring torque in an electric motor, thereby helping to ensure the accuracy of motor torque determinations, so that motor driven systems can be effectively operated.

SUMMARY OF INVENTION

Accordingly, the invention provides a method for monitoring torque in an electric motor having a power source connected thereto. The method includes measuring current of the motor, determining speed of the motor, and determining a first torque. The first torque is a function of at least the measured current. Power output from the power source is determined, a power loss for the motor is determined, and a second torque is determined. The second torque is a function of at least the power output from the power source, the determined power loss, and the motor speed. The first torque is compared to the second torque when the motor speed is above a predetermined speed.

The invention also provides a method for monitoring torque in an electric motor disposed in a vehicle having an engine and a power source. The power source is connected to the motor and at least one other vehicle electrical load. The method includes measuring current of the motor, determining a first torque based on the measured current, and determining speed of the motor. A first motor power is also determined. The first motor power is a function of power output from the power source and a power loss for the motor. The power loss includes at least one of an electrical power loss of the motor, a mechanical power loss of the motor, and a power consumed by the at least one other vehicle electrical load. A second torque is determined. The second torque is a function of at least the first motor power and the motor speed. The first torque is compared to the second torque when the motor speed is above a predetermined speed.

The invention further provides a system for monitoring torque in an electric motor having a power source connected thereto. The motor is in communication with a motor controller, a first sensor configured to facilitate determination of motor speed, and at least one current sensor for measuring motor current. The system includes a first controller in communication with the motor controller and the sensors. The first controller is configured to receive an input related to the motor speed from the first sensor. It is also configured to receive an input related to the motor current from the at least one current sensor. The controller is further configured to determine a first motor power, first and second torques, and to compare the first torque to the second torque when the motor speed is above a predetermined speed. The first motor power is a function of power output from the power source and a power loss for the motor. The first torque is a function of at least the motor current, and the second torque is a function of at least the first motor power and the motor speed.

DETAILED DESCRIPTION

Figure 1:
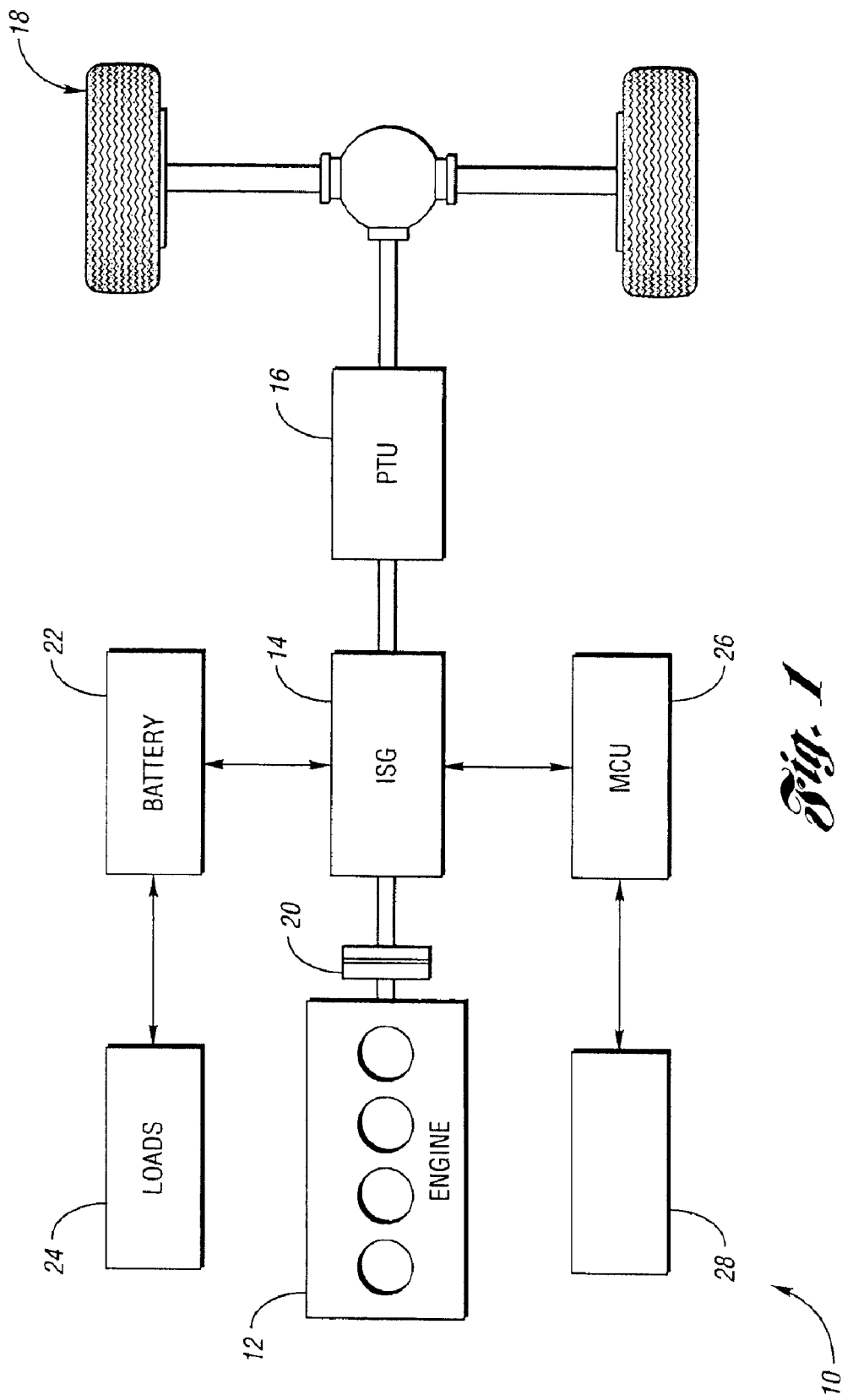
FIG. 1 is a schematic representation of a portion of a vehicle including a system in accordance with the present invention.

FIG. 1 is a schematic representation of a system 10 in accordance with the present invention. A vehicle, not shown in its entirety, includes an engine 12 and a motor, or integrated starter generator (ISG) 14. Connected to the ISG 14 is a power transfer unit (PTU) 16, which may be a conventional transmission, a continuous variable transmission (CVT), or other apparatus for transferring power from the engine 12 and the ISG 14 to vehicle wheels 18. A disconnect clutch 20 is disposed between the engine 12 and the ISG 14, and can be used to selectively disconnect the engine 12 from the ISG 14. This allows torque to be provided to the vehicle wheels 18 from both the engine 12 and the ISG 14, or alternatively, from the ISG 14 alone.

A power source, or battery 22, is connected to the ISG 14, which may receive electric power from the battery 22, or charge the battery 22 when the ISG 14 is being run in a regenerative mode. Of course, other power sources may be used in place of a battery—e.g., a fuel cell or an ultracapacitor, just to name two. The battery 22 also provides power to other vehicle devices, such as an air conditioning system, power steering pump, etc. A DC/DC converter (not shown) may also be used to reduce the voltage from the battery 22 to supply low voltage loads. Such low voltage loads may include a stereo system, mirror lights, etc. All of these electrical loads are represented by block 24 in FIG. 1.

The system 10 includes a first controller, or motor control unit (MCU) 26, which controls operation of the ISG 14. As explained more fully below, the MCU 26 also provides torque monitoring for the ISG 14. A second controller 28 is provided for verifying the torque monitoring of the MCU 26, and is therefore shown as a separate hardware device. Alternatively, the controller 28 could be integrated into an existing controller separate from the MCU 26. For example, the controller 28 could be a software controller integrated into an existing powertrain control module (PCM) or a transaxle control module (TCM) in communication with the MCU 26.

Figure 2:
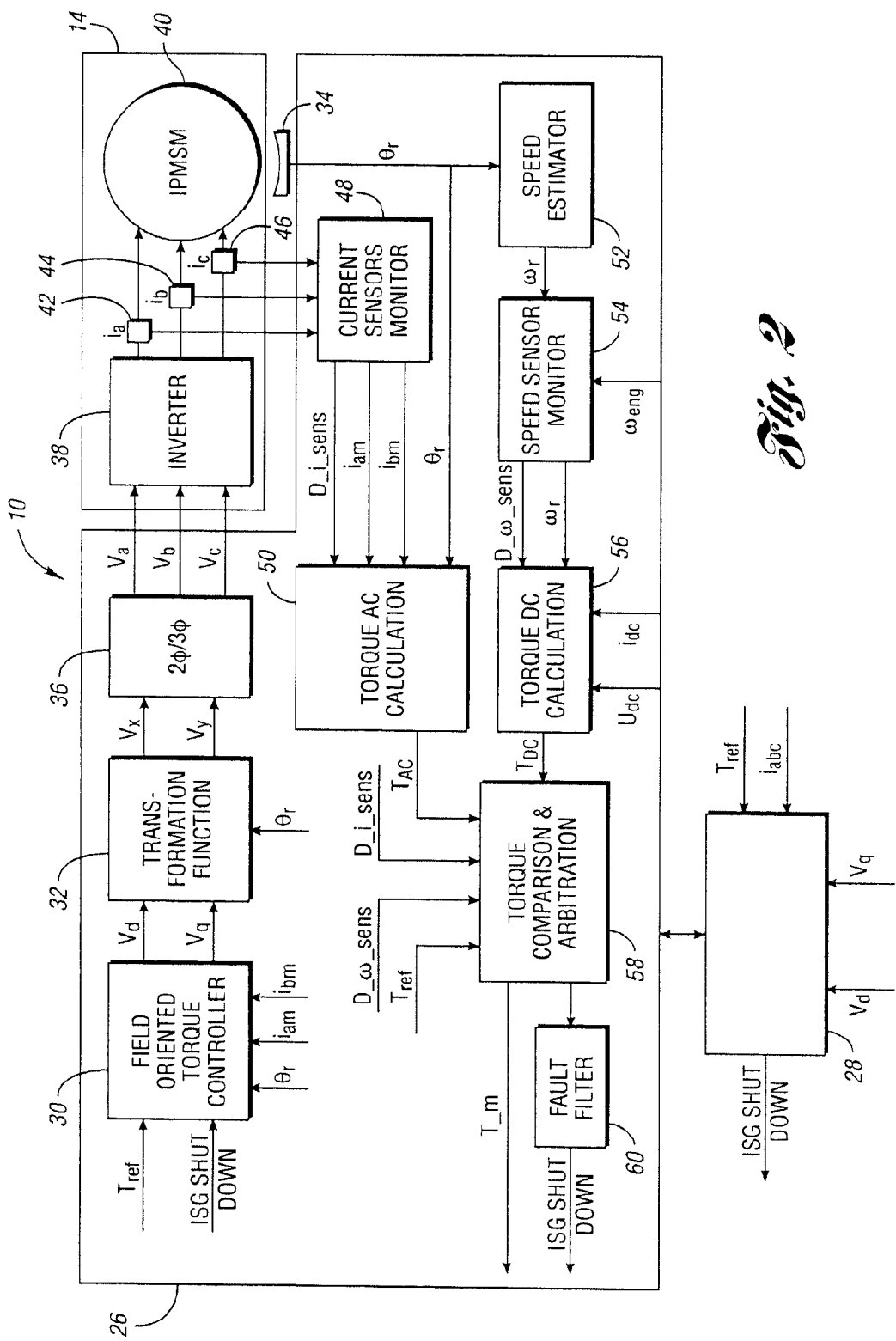
FIG. 2 is a detailed schematic representation of the system shown in FIG. 1.

The system 10, including the MCU 26 and the controller 28, is shown in greater detail in FIG. 2. The first elements of the MCU 26 include standard motor control elements, well known to those in the art, and are therefore described here with limited detail. For example, a motor controller, or a field oriented torque controller 30 receives a variety of inputs, and then outputs voltages to a transformation function 32. The inputs received by the torque controller 30 include a reference torque ($T_{ref}$) which is a torque command based on an acceleration request from a vehicle operator. The torque controller 30 may also receive a shutdown command for the ISG 14, depending on vehicle requirements and the outcome of the torque monitoring explained below. Other inputs may include the angular position of the ISG 14, or more specifically, the angular position of a rotor ($\theta_r$) as measured by a first sensor, or position sensor 34.

In the embodiment shown in FIGS. 1 and 2, the ISG 14 is a three phase motor, having three motor currents, or phase currents: $i_a$, $i_b$, and $i_c$. The torque controller 30 only receives two of the three currents, because, as explained more fully below, there is a known relationship between any two of the currents and the third. Thus, as shown in FIG. 2, the torque controller 30 receives currents $i_{am}$ and $i_{bm}$.

In response to the inputs received, the torque controller 30 outputs voltage signals to the transformation function 32. Specifically, the transformation function 32 receives signals related to voltages $V_d$, $V_q$, which represent the voltages along the d and q axes, respectively. The d-q axes are normal to each other, and represent a frame of reference that rotates with the rotor in the ISG 14. The transformation function 32 also receives the rotor position ($\theta_r$), and transforms $V_d$ and $V_q$ into voltages along a fixed reference frame, $V_x$ and $V_y$. A two phase to three phase converter 36 converts the two phase voltages $V_x$, $V_y$ into three voltages $V_a$, $V_b$, and $V_c$, which are sent to the ISG 14.

The ISG 14 includes an inverter 38 and an interior permanent-magnet synchronous machine (IPMSM) 40. Of course, other electric machines could be used, for example, an induction machine. The inverter 38 receives DC power from the battery 22, and the voltage signals $V_a$, $V_b$, and $V_c$ from the converter 36. The inverter 38 then outputs AC current $i_a$, $i_b$, and $i_c$ to the IPMSM 40. The ISG 14 includes three current sensors 42, 44, 46 for measuring the currents $i_a$, $i_b$, $i_c$, respectively. Of course, current sensors need not be integrated into an inverter, such as the inverter 38, but rather, may be separate devices.

To verify the accuracy of the current sensors 42, 44, 46, the MCU 26 includes a current sensors monitor 48. The monitor 48 uses a sum current method to determine the accuracy of the phase current measurements. In particular, the monitor 48 uses the following equation:

$$|i_a + i_b + i_c| \leq \epsilon_I \qquad \text{Eq. 1}$$

where, $i_a$, $i_b$, $i_c$ are the phase currents, and $\epsilon_I$ is a predetermined current value, chosen to be some very small value. In theory, the sum of the phase currents is zero; however, $\epsilon_I$ may be set to some small, non-zero value, and the accuracy of the current sensors 42, 44, 46 will still be verified.

The current sensors monitor 48 outputs a number of signals to an AC torque calculator 50. These signals include a signal D_i_sens, which indicates whether the current sensors 42, 44, 46 contain a fault, and current signals $i_{am}$ and $i_{bm}$. Only two current signals are provided to the torque calculator 50, since the third current $i_{cm}$ is known from Equation 1. Also provided as an input to the torque calculator 50 is $\theta_r$, the position signal output from the position sensor 34.

A first, or AC torque, may be calculated using the following equation:

$$T_{AC} = \frac{3}{2} \cdot n_p [\psi_F i_{sq} + (L_{sd} - L_{sq}) i_{sd} i_{sq}] \qquad \text{Eq. 2}$$

where $n_p$ is the number of pole pairs in the IPMSM 40, $L_s$ and $I_s$ are stator inductance and current, respectively (with subscripts d and q indicating the frame of reference), and $\psi_F$ is the constant flux linkage produced by the permanent magnets in the IPMSM 40. Although Equation 2 accurately defines the AC torque in the ISG 14, in practice, it may be more convenient to determine the AC torque from a lookup table. Such a table correlates various currents with corresponding output torques for the ISG 14.

The position sensor 34 also outputs a signal to a speed estimator 52. The speed estimator 52 uses the change in angular position of the rotor in the ISG 14 over a known period of time to determine the rotor speed ($\omega_r$). The speed estimator 52 then sends a signal related to $\omega_r$ to a speed sensor monitor 54.

The speed sensor monitor 54 also receives a signal ($\omega_{eng}$) related to the speed of the engine 12. The engine speed and the speed of the ISG 14 are then compared, using the following equation:

$$|\omega_r - \omega_{eng}| \leq \epsilon_\omega \qquad \text{Eq. 3}$$

where $\epsilon_\omega$ is some small value. Thus, the speed sensor monitor 54 helps to ensure the integrity of the position sensor measurement and rotor speed calculation. When the engine 12 is disconnected from the ISG 14—e.g., when the disconnect clutch 20 is open—another speed, such as the speed of the PTU 16, can be used in place of the engine speed. Of course, a different value for $\epsilon_\omega$ may need to be used.

The speed sensor monitor 54 then outputs signals to a DC torque calculator 56. The DC torque calculator 56 receives a signal related to the rotor speed, as well as a signal (D_$\omega$_sens) indicating whether the speed sensor monitor 54 verified the speed of the rotor ($\omega_r$). In addition, the DC torque calculator receives signals $U_{DC}$ and $i_{DC}$, which are related to the voltage and current, respectively, output by the battery 22. Thus, the DC torque calculator 54 can calculate the power output from the battery 22 as the product of $U_{DC}$ and $i_{DC}$.

Because not all of the power output from the battery 22 is received by the ISG 14, a more accurate DC torque calculation considers power losses from other electrical loads, such as the loads 24. In addition, the ISG 14 will inherently have some electrical power loss and some mechanical power loss. Therefore, the DC torque calculator 56 reduces the power output from the battery 22 by the power consumed by other electrical loads 24 and the power losses of the ISG 14, to determine a first motor power ($P^*_{DC}$). This relationship is illustrated in the following equation:

$$P^*_{DC} = P_{DC} - P_{LOADS} - P_{ELEC} - P_{MECH} \qquad \text{Eq. 4}$$

where $P_{DC}$ is the power output from the battery 22, $P_{LOADS}$ is the power consumed by the loads 24, $P_{ELEC}$ is the electrical power loss of the ISG 14, including losses in the inverter 38 and the IPMSM 40, and $P_{MECH}$ is the mechanical power losses of the ISG 14. The torque calculator 56 then divides $P^*_{DC}$ by $\omega_r$ to determine the DC torque of the ISG 14.

A torque comparison and arbitrator 58 then receives a signal ($T_{AC}$) from the AC torque calculator 50, and another signal ($T_{DC}$) from the DC torque calculator 56. In addition, the torque comparison and arbitrator 58 receives the sensor fault signals (D_$\omega$_sens) and (D_i_sens), and the reference torque ($T_{ref}$). The torque comparison and arbitrator 58 then uses a number of equations to monitor the torque of the ISG 14.

First, it is determined whether the speed of the rotor ($\omega_r$) is above a predetermined speed. If it is, the AC torque ($T_{AC}$) and the DC torque ($T_{DC}$) will be compared to each other. This is shown in the following equation:

$$|T_{AC} - T_{DC}| \leq \epsilon_T \qquad \text{Eq. 5}$$

where $\epsilon_T$ is a first predetermined torque which may be chosen based on the confidence of the terms in Equation 4. For example, some of the power losses used in Equation 4 may be estimates having high or low confidence levels. Where the confidence levels are low, the value of $\epsilon_T$ may be chosen to be somewhat higher, because it will be expected that there will be a greater difference between the AC torque and the DC torque. Where the confidence levels in Equation 4 are high, however, $\epsilon_T$ may be relatively small, since the AC torque and the DC torque should be almost equal.

If the speed of the ISG 14—i.e., the rotor speed ($\omega_r$)—is below the predetermined speed, the DC torque calculation may not be accurate enough to use in Equation 5. As an alternative, the first motor power ($P^*_{DC}$) can be compared to a second, or AC motor power. The AC motor power ($P_{AC}$) is easily calculated as the product of the voltage and current of the ISG 14. Therefore, when $\omega_r$ is below the predetermined speed, the following equation can be used in place of Equation 5:

$$|P_{AC} - P^*_{DC}| \leq \epsilon_p \qquad \text{Eq. 6}$$

where $\epsilon_p$ is a predetermined motor power which, like $\epsilon_T$, depends on the confidence of the power loss terms used in Equation 4.

The torque comparison and arbitrator 58 also compares the reference torque ($T_{ref}$) to the AC torque as shown in the following equation:

$$|T_{AC} - T_{ref}| \leq \epsilon_{ref} \qquad \text{Eq. 7}$$

where $\epsilon_{ref}$ is a reference torque that may be chosen based on a number of considerations. For example, $\epsilon_{ref}$ may be chosen based on an allowable deviation between an operator generated acceleration command and an actual vehicle acceleration. Because the acceleration of the vehicle is directly related to the torque of the ISG 14, an allowable acceleration deviation is easily transformed into an allowable torque deviation ($\epsilon_{ref}$).

After performing the calculations discussed above, the torque comparison and arbitrator 58 can then output one or more signals indicating the results of the torque monitoring. For example, if the relationships of the equations hold, the torque comparison and arbitrator 58 may put out a signal (T_m) related to the torque of the ISG 14, and indicating that the torque has been successfully monitored. Alternatively, if one or more of the relationships in the above-referenced equations do not hold, the torque comparison and arbitrator 58 may send a signal to shut down the ISG 14. In such a case, the signal could go through a fault filter 60 which would allow a time lapse $\Delta t$ prior to the ISG 14 being completely shut down.

Of course, a torque comparison and arbitrator, such as the torque comparison and arbitrator 58, may output a wide variety of signals, which cause various actions to be taken on an electric motor and associated systems. For example, verifying the torque of an electric motor may be more or less critical, depending on whether the motor is used to drive a vehicle, or is used in some other application. Therefore, as an alternative to shutting down the motor when there is a detected problem with the motor torque, the speed or torque of the motor could be reduced, or other systems adjusted to compensate for the detected torque fault.

In order to verify output from the MCU 26, the controller 28 can perform one or more verification calculations. As inputs, the controller 28 receives the reference torque ($T_{ref}$) and the phase currents ($i_{abc}$). The controller 28 can then compare a parameter value of the ISG 14 to a corresponding expected parameter value when the reference torque is zero. For example, the controller 28 can use a logic similar to that found in the field oriented torque controller 30 or the transformation function 32 to transform the phase currents $i_{abc}$ into $i_d$ and $i_q$ in the rotating d-q reference frame—see, e.g., Equation 2. Because $i_d$ and $i_q$ should equal zero when the torque reference is zero, the controller 28 can apply the following equation:

$$i_d^2 + i_q^2 \leq \epsilon_{I0} \qquad \text{Eq. 8}$$

where $\delta_{I0}$ is the current deviation tolerance when the reference torque is zero. Equation 8 is also valid for any two of the phase currents, $i_a$, $i_b$, $i_c$, which may be more convenient to use, since a transformation function is not required.

Similarly, $V_d$ and $V_q$ can be input from the field oriented torque controller 30. When the reference torque is zero, $V_d$ should also be zero; however, $V_q$ is dependent on the frequency ($f_{ISG}$) of the ISG 14 and the flux ($\psi_F$) of the magnets in the ISG 14. Therefore, the controller 28 can also use the following equation:

$$|V_d^2 + (V_q - f_{ISG}\psi_F)^2| \leq \delta_{V0} \qquad \text{Eq. 9}$$

where $\epsilon_{V0}$ is the voltage deviation tolerance when the reference torque is zero. Because Equation 9 contains the flux term ($\psi_F$), which results from the presence of the permanent magnets in the IPMSM, the transformed voltages $V_d$, $V_q$ are used. In the case of an induction machine, the flux term is not present, and any two of the voltages $V_a$, $V_b$, $V_c$ can be used. If the controller 28 determines that the relationships in Equations 8 and 9 hold, nothing more needs to be done; however, if the relationships do not hold, the controller 28 can output a signal to shut down the ISG 14.

Figure 3:
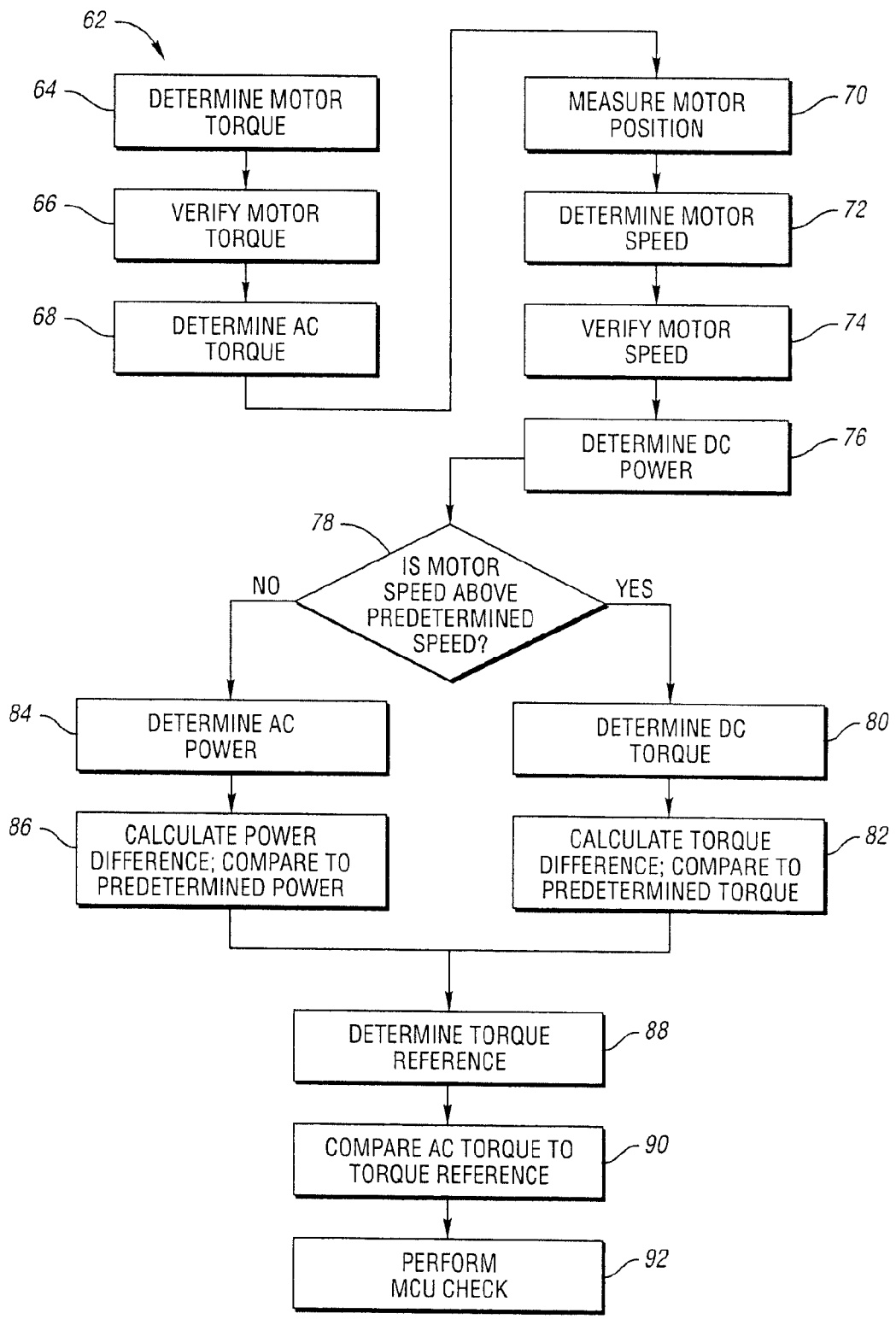
FIG. 3 is a flow chart illustrating a method in accordance with the present invention.

FIG. 3 shows a flow chart 62 which conveniently illustrates the method employed by the MCU 26. First, at step 64, the motor currents, or phase currents $i_a$, $i_b$, $i_c$ are determined. Next, at step 66, the current sensors monitor 48 verifies the motor currents—see Equation 1. The AC torque is then determined by the AC torque calculator 50, by using a preprogrammed lookup table in which the motor current is compared to a list of motor currents in the table; a corresponding AC torque is then determined—see step 68.

The motor position, or the angular position ($\theta_r$) of the rotor is measured by the position sensor 34 at step 70. At step 72, the speed estimator 52 then determines the motor speed based on the change in angular position of the rotor over some known period of time. The motor speed is then verified by the speed sensor monitor 54 using Equation 3—see step 74.

The DC torque calculator 56 then uses Equation 4 to determine the DC power—see step 76. At this point, it is determined whether the motor speed ($\omega_r$) is above the predetermined speed—see decision block 78. If $\omega_r$ is above the predetermined speed, the DC torque calculator 56 then determines the DC torque by dividing the result of Equation 4 ($P^*_{DC}$) by the motor speed ($\omega_r$)—see step 80. At step 82, the torque comparison and arbitrator 58 uses Equation 5 to determine the difference between the AC torque and the DC torque. If the motor speed ($\omega_r$) is not above the predetermined speed, the AC power of the ISG 14 is determined based on the voltage and current of the ISG 14, both of which are easily measured—see step 84. At step 86, the torque comparison and arbitrator 58 compares the AC power to the DC power using Equation 6.

The torque comparison and arbitrator 58 then determines the torque reference ($T_{ref}$) from an input signal it receives—see step 88—and then compares the torque reference ($T_{ref}$) to the AC torque previously determined in step 68—see step 90. Finally, the controller 28 performs a check of the MCU 26 using Equations 8 and 9—see step 92. It is important to note that although many of the steps shown in the flow chart 62 are shown sequentially, they may in fact be performed in a different sequence, and some of the steps may be performed simultaneously.

Figure 4A:
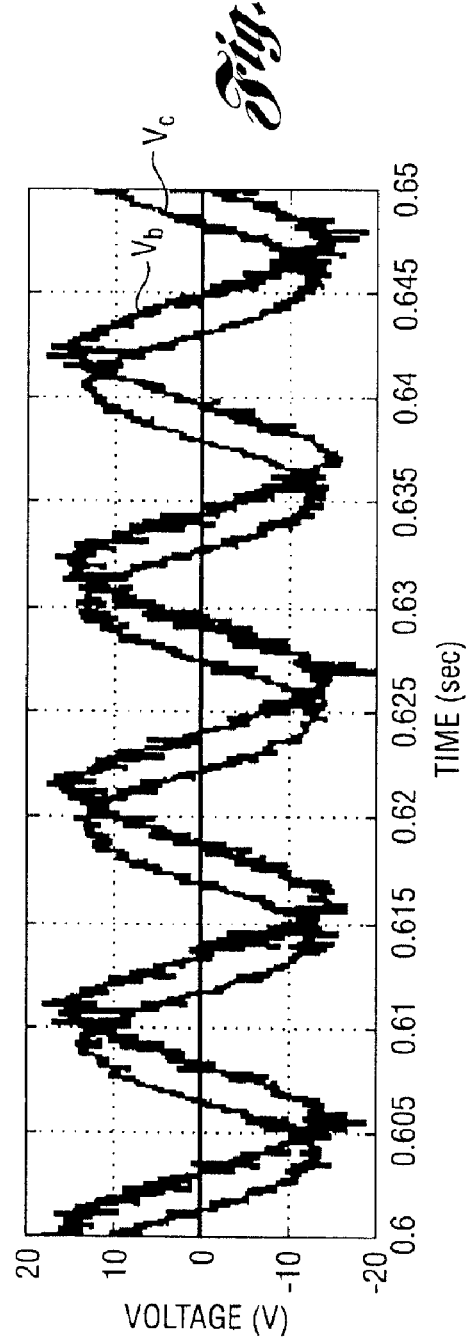
FIGS. 4A and 4B show simulation results of a one phase voltage fault in an electric motor.
Figure 4B:
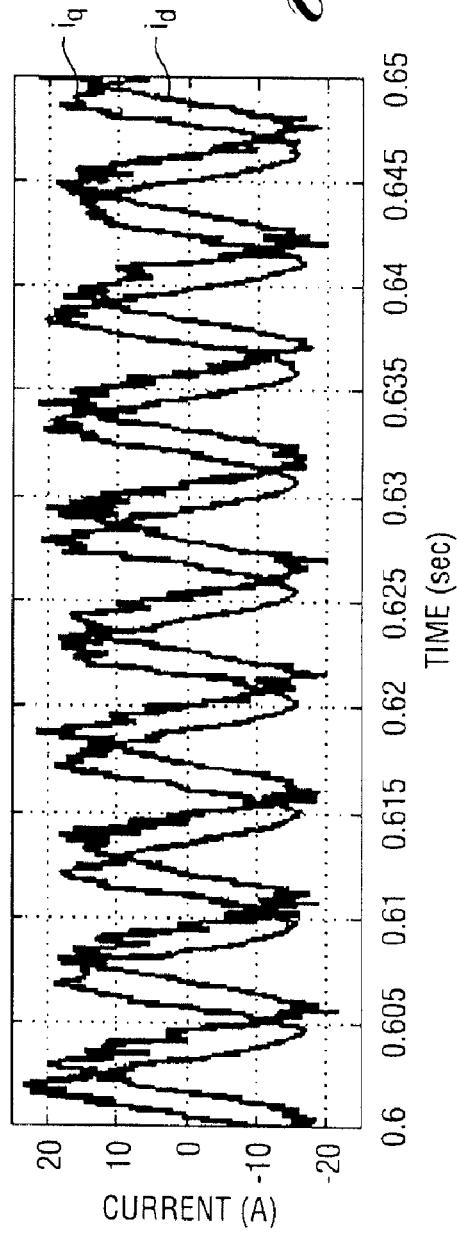

FIGS. 4A, 4B, 5 and 6A–6C illustrate how the system 10 and method described above can be used to detect various types of faults. For example, FIGS. 4A and 4B show voltage and current outputs, respectively, for a simulation representing a one phase inverter fault ($V_a$=0) for a zero torque reference and a motor frequency of 100 rad/sec. Because the torque reference is zero, $i_d$ and $i_q$ should also be zero, and the relationship shown in Equation 8 should hold. An examination of FIG. 4B, however, indicates that this is not the case. In fact, $i_d$ and $i_q$ each have an amplitude of approximately 20 amps. Thus, a controller, such as the controller 28, would detect the inverter fault based on an application of Equation 8.

Figure 5:
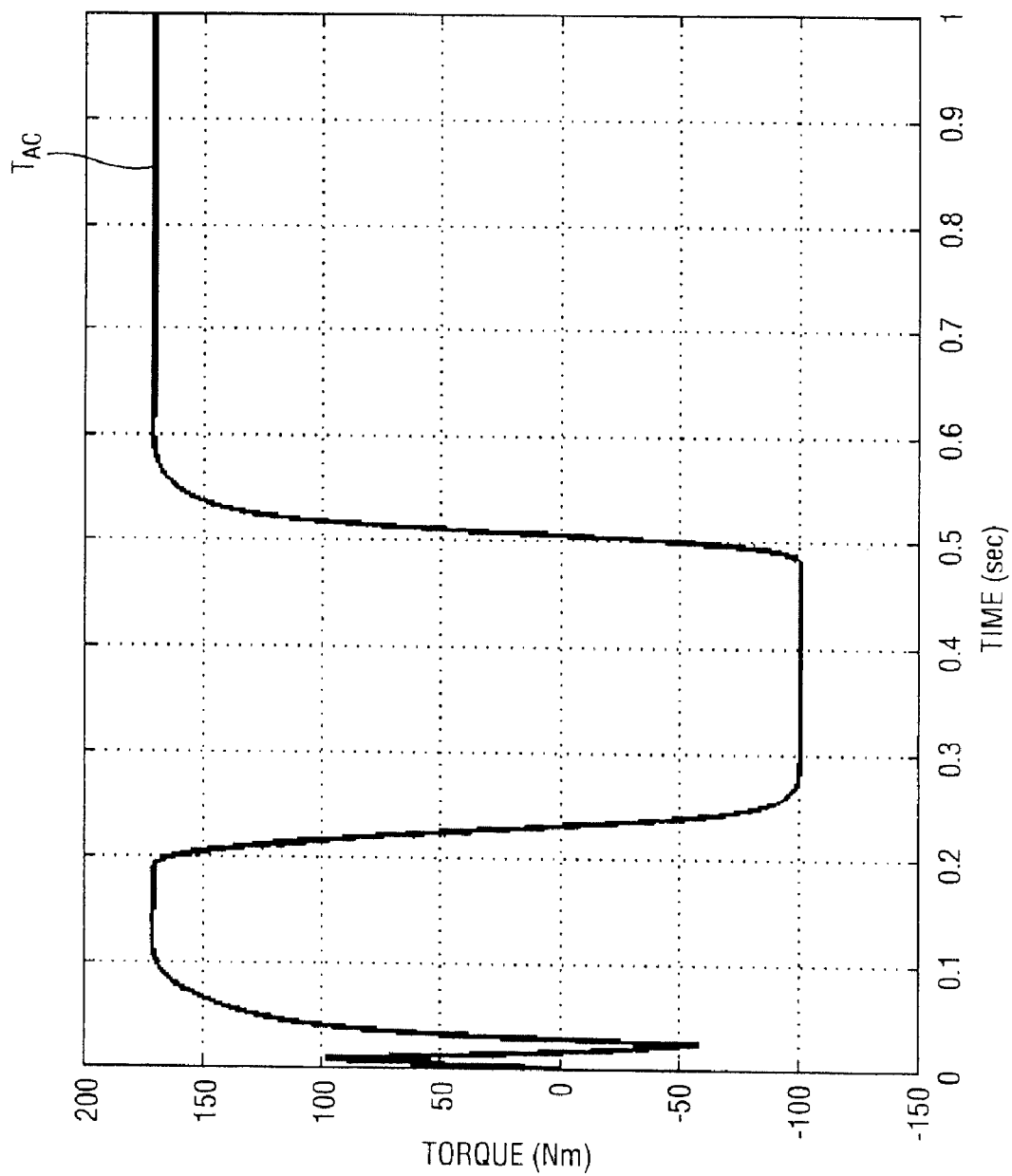
FIG. 5 shows simulation results for a polarity fault in an electric motor.

FIG. 5 shows simulation results of a current polarity fault for a reference torque of zero. As seen in the graph, the AC torque reaches a maximum level in approximately 0.1 seconds. This type of fault can be detected by a comparison of the AC torque with the reference torque, as shown in Equation 7.

Figures 6A, 6B, 6C:
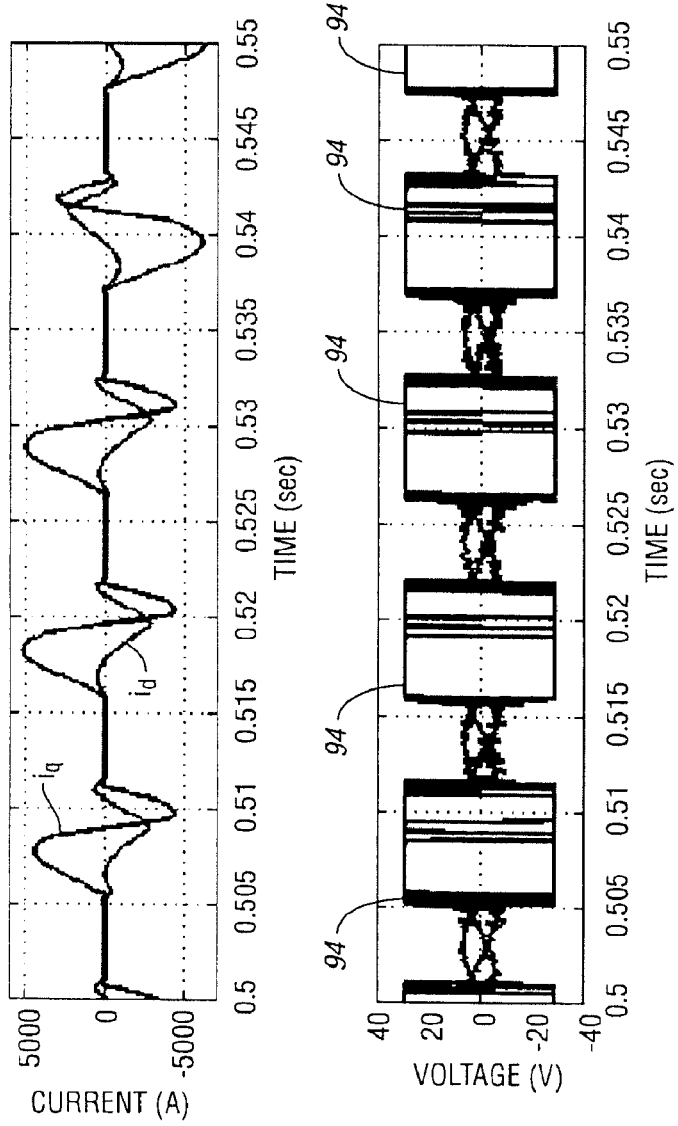
FIGS. 6A, 6B and 6C show simulation results for a position sensor fault, wherein the position sensor is configured to monitor the position of an electric motor.

FIGS. 6A–6C represent simulation results of an ISG having a position sensor fault. FIG. 6A shows the currents $i_d$ and $i_q$ over some period of time. FIG. 6B shows the voltage of an ISG over the same period of time, and FIG. 6C shows the reference torque and the AC torque over an extended period of time. From FIG. 6A, it is seen that the currents $i_d$ and $i_q$ exhibit spikes. In FIG. 6B, it is seen that the ISG voltage saturates at time instances 94. This saturation occurs when the position sensor readings are orthogonal to the rotor magnet flux orientation. Despite the position sensor fault, the average AC torque, shown in FIG. 6C, follows the torque reference—even if it follows only weakly. This type of position sensor fault can be detected by verifying the zero reference conditions using Equations 8 and 9, or by comparing the AC torque with the torque reference, as in Equation 7.

While the best mode for carrying out the invention has been described in detail, those familiar with the art to which this invention relates will recognize various alternative designs and embodiments for practicing the invention as defined by the following claims.

What is claimed is:

1. A method for monitoring torque in an electric motor having a power source connected thereto, the method comprising:
   measuring current of the motor;
   determining speed of the motor;
   determining a first torque, the first torque being a function of at least the measured current;
   determining power output from the power source;
   determining a power loss for the motor;
   determining a second torque, the second torque being a function of at least the power output from the power source, the determined power loss, and the motor speed; and
   comparing the first torque to the second torque when the motor speed is above a predetermined speed.

2. The method of claim 1, wherein comparing the first torque to the second torque includes calculating a difference between the first and second torques, and comparing the difference to a first predetermined torque.

3. The method of claim 1, the power source having at least one additional electrical load other than the motor, wherein the power loss is determined from at least one of the following, power consumed by the at least one additional electrical load, an electrical power loss of the motor, and a mechanical power loss of the motor.

4. The method of claim 1, further comprising:
   determining a first motor power, the first motor power being a function of at least the power output from the power source and the determined power loss;
   determining a second motor power, the second motor power being a function of at least motor voltage and motor current; and
   comparing the first motor power to the second motor power when the motor speed is at or below the predetermined speed.

5. The method of claim 4, wherein comparing the first motor power to the second motor power includes calculating a difference between the first and second motor powers, and comparing the difference to a predetermined motor power.

6. The method of claim 1, the motor being a three phase motor having three motor currents, the method further comprising verifying the motor current measurement, the verification including summing the three motor currents and comparing the current sum to a predetermined current value.

7. The method of claim 1, wherein the motor speed is measured with at least one sensor configured to measure an angular position of the motor, and the motor speed is determined by measuring change in the angular position of the motor over a known period of time.

8. The method of claim 1, the motor receiving a torque command, the method further comprising calculating a difference between the first torque and the torque command, and comparing the difference to a second predetermined torque value.

9. The method of claim 8, further comprising comparing at least one motor parameter value to a corresponding expected parameter value when the torque command is zero, the at least one motor parameter value including the motor current.

10. A method for monitoring torque in an electric motor disposed in a vehicle having an engine and a power source, the power source being connected to the motor and at least one other vehicle electrical load, the method comprising:
   measuring current of the motor;
   determining a first torque based on the measured current;
   determining speed of the motor;
   determining a first motor power, the first motor power being a function of power output from the power source and a power loss for the motor, the power loss including at least one of, an electrical power loss of the motor, a mechanical power loss of the motor, and power consumed by the at least one other vehicle electrical load;
   determining a second torque, the second torque being a function of at least the first motor power and the motor speed; and
   comparing the first torque to the second torque when the motor speed is above a predetermined speed.

11. The method of claim 10, wherein comparing the first torque to the second torque includes calculating a difference between the first and second torques, and comparing the difference to a first predetermined torque.

12. The method of claim 10, wherein determining the first torque includes comparing the measured current to current values in a table, and determining the torque corresponding to the measured current.

13. The method of claim 10, further comprising:
   determining a second motor power, the second motor power being a function of at least motor voltage and motor current; and
   comparing the first motor power to the second motor power when the motor speed is at or below the predetermined speed.

14. The method of claim 13, wherein comparing the first motor power to the second motor power includes calculating a difference between the first and second motor powers, and comparing the difference to a predetermined motor power.

15. The method of claim 10, the motor being a three phase motor having three motor currents, the method further comprising verifying the motor current measurement, the verification including summing the three motor currents and comparing the current sum to a predetermined current value.

16. The method of claim 10, further comprising:
   determining speed of the engine; and
   comparing the measured motor speed to the determined engine speed.

17. The method of claim 10, the motor receiving a torque command, the method further comprising calculating a difference between the first torque and the torque command, and comparing the difference to a second predetermined torque value, the second predetermined torque value being based on an allowable acceleration deviation of the vehicle.

18. A system for monitoring torque in an electric motor having a power source connected thereto, the motor being in communication with a motor controller, a first sensor configured to facilitate determination of motor speed, and at least one current sensor for measuring motor current, the system comprising:
   a first controller in communication with the motor controller and the sensors, the first controller being configured to receive an input related to the motor speed from the first sensor and receive an input related to the motor current from the at least one current sensor, the first controller being further configured to determine a first motor power, first and second torques, and to compare the first torque to the second torque when the motor speed is above a predetermined speed, the first motor power being a function of power output from the power source and a power loss for the motor, the first torque being a function of at least the motor current, the second torque being a function of at least the first motor power and the motor speed.

19. The system of claim 18, wherein the first controller is further configured to determine a second motor power, and to compare the first motor power to the second motor power when the motor speed is at or below the predetermined speed, the second motor power being a function of at least voltage and current in the motor.

20. The system of claim 18, the motor being a three phase motor having three motor currents, wherein the first controller is further configured to verify current measurement of the at least one current sensor, the verification including summing the three motor currents and comparing the current sum to a predetermined current value.

21. The system of claim 18, the first sensor including a speed sensor configured to measure an angular position of the motor, wherein the first controller determines the motor speed based on the measured change in the angular position of the motor over a known period of time.

22. The system of claim 18, the motor receiving a torque command, wherein the first controller is further configured to calculate a difference between the first torque and the torque command, and compare the difference to a second predetermined torque value.

23. The system of claim 22, further comprising a second controller in communication with the first controller, the second controller being configured to compare at least one motor parameter value to a corresponding expected parameter value when the torque command is zero, the at least one motor parameter value including the motor current.

* * * * *